(12) United States Patent
Kim et al.

(10) Patent No.: US 9,846,341 B2
(45) Date of Patent: Dec. 19, 2017

(54) DISPLAY DEVICE

(71) Applicant: Samsung Display Co., Ltd., Yongin (KR)

(72) Inventors: Cheol Kyu Kim, Seoul (KR); Dae Young Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 3 days.

(21) Appl. No.: 14/685,366

(22) Filed: Apr. 13, 2015

(65) Prior Publication Data

US 2016/0161812 A1 Jun. 9, 2016

(30) Foreign Application Priority Data

Dec. 3, 2014 (KR) ........................ 10-2014-0172316

(51) Int. Cl.
*G02F 1/1362* (2006.01)
*G02B 5/30* (2006.01)
*G02F 1/1335* (2006.01)

(52) U.S. Cl.
CPC ..... *G02F 1/136204* (2013.01); *G02B 5/3058* (2013.01); *G02F 2001/133548* (2013.01)

(58) Field of Classification Search
CPC ................................................ G02F 1/136204
See application file for complete search history.

(56) References Cited

U.S. PATENT DOCUMENTS 6,243,199 B1 6/2001 Hansen et al.
2003/0234971 A1* 12/2003 Murade ............ G02F 1/136209
359/315
2006/0061519 A1* 3/2006 Fisher ............... G02F 1/133528
345/32
2008/0100781 A1* 5/2008 Choo ................ G02F 1/133536
349/96
2012/0057106 A1* 3/2012 Park .................. G02F 1/133528
349/96
2012/0127404 A1* 5/2012 Takada ............. G02F 1/133528
349/96

FOREIGN PATENT DOCUMENTS

| KR | 10-0339018 | 5/2002 |
| KR | 10-2004-0033414 | 4/2004 |
| KR | 10-2008-0058686 | 6/2008 |
| KR | 10-2013-0002528 | 1/2013 |
| KR | 10-2014-0013654 | 2/2014 |

OTHER PUBLICATIONS

Jackson, et al., "Boundary-Value Problems in Electrostatistics: I, Classical Electrodynamics", 1999, pp. 74-79, 3rd ed., John Wiley & Sons, Inc., USA.

* cited by examiner

*Primary Examiner* — Edmond Lau
(74) *Attorney, Agent, or Firm* — H.C. Park & Associates, PLC

(57) ABSTRACT

A display device includes a transparent substrate; a plurality of electro-conductive polarizers disposed on the transparent substrate; an insulating layer disposed on the plurality of electro-conductive polarizers; and a plurality of gate lines disposed on the insulating layer, wherein each of the plurality of electro-conductive polarizers is coupled to each of the plurality of gate lines.

20 Claims, 11 Drawing Sheets

DISPLAY DEVICE

CROSS-REFERENCE TO RELATED APPLICATION

This application claims priority from and the benefit of Korean Patent Application No. 10-2014-0172316, filed on Dec. 3, 2014, which is hereby incorporated by reference for all purposes as if fully set forth herein.

BACKGROUND

Field

Exemplary embodiments relate to a display device.

Discussion of the Background

In general, liquid crystal display (LCD) devices are electronic devices that transform electrical information generated from various devices into visual information using the change of the transmittance of liquid crystal layer according to a voltage applied to the liquid crystals.

An LCD device has long been considered capable of overcoming the limitations of, and replacing, a cathode ray tube (CRT) that used to be widely used due to its various advantages such as compactness, lightness and low power consumption, and may be used in nearly all information processing devices that require a display device.

Since an LCD device does not completely transmit light provided by a backlight unit, the brightness of an LCD device may be of great importance. To improve the brightness of an LCD device, a variety of films have been developed and used, and examples of the films include a reflective polarizing film (or plate).

There are various types of reflective polarizing films available, such as a dual brightness enhancement film (DBEF) or a diffusive reflective polarization film (DRPF). The DBEF is a film in which isotropic films and anisotropic films are repeatedly formed to have a stack structure of hundreds of layers. The DBEF may increase the brightness of an LCD device by transmitting light through its stack structure to increase the amount of light transmittance. On the other hand, the DRPF may include a material with a different refractive index from the refractive index thereof, and may thus increase the amount of light transmittance by allowing light to be reflected and refracted by the material.

The DBEF, among other reflective polarizing films, has a high brightness improvement ratio. Accordingly, when applied to an LCD device, the DBEF can enhance the optical efficiency characteristics of the LCD device. However, the DBEF cannot be considered a complete polarizer element. Also, the fabrication of the DBEF involves a very complicated process of forming a stack structure of hundreds of thin film layers. Also, the manufacturing cost of the DBEF is very high.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the invention provide a display device capable of preventing defects caused by an electrostatic discharge.

Exemplary embodiments of the invention also provide a display device capable of minimizing or suppressing the increase of parasitic capacitance between a gate line and an electro-conductive polarizer.

Additional aspects will be set forth in the detailed description which follows, and, in part, will be apparent from the disclosure, or may be learned by practice of the inventive concept.

Exemplary embodiments of the invention also provide a display device capable of minimizing or suppressing the increase of parasitic capacitance.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a display device includes a transparent substrate, an insulating layer including a through hole and disposed on the transparent substrate; a gate line disposed on the insulating layer; and an electro-conductive polarizer disposed between the transparent substrate and the insulating layer.

The through hole may be filled with an electric conductor. The electric conductor may be electrically connected to the electro-conductive polarizer. The electric conductor may be electrically connected to the gate line. In a non-limiting example, the electric conductor may be formed of a metal that forms the gate line.

The electro-conductive polarizer comprises a plurality of metal wires, which are isolated from one another, and at least one bridge, which electrically connects the metal wires together.

A longitudinal axis of the metal wires may be parallel to a first direction, the bridge may extend in a second direction, which is perpendicular to the first direction, and the gate line may extend in the first direction.

The metal wires may have a first line width, and the bridge may have a second line width, which is greater than the first line width. The bridge may be electrically connected to the gate line via the through hole. In a non-limiting example, the electro-conductive polarizer may be formed of a metal.

The bridge may be disposed on a level with the metal wires or may be disposed between the metal wires and the insulating layer.

The display device may also include a plurality of pixels arranged in rows and columns. The bridge may include a first bridge, which is electrically connected to an n-th gate line that transmits a gate signal to an n-th row of pixels, and a second bridge, which is electrically connected to an (n+1)-th gate line that transmits a gate signal to an (n+1)-th row of pixels, and the first and second bridges are insulated from each other. The first and second bridges may be isolated, and insulated, from each other.

The electro-conductive polarizer may include a linear pattern and a bridge, which surrounds the linear pattern. The linear pattern may include a plurality of conductive metal wires, which are isolated from one another. The bridge may electrically connect the conductive metal wires together. The bridge may be disposed to overlap boundaries of a pixel electrode.

The electro-conductive polarizer may include first and second electro-conductive polarizers, which are independent from each other, the first electro-conductive polarizer includes a first linear pattern, which overlaps a first pixel, and a first bridge, which surrounds the first linear pattern, and the second electro-conductive polarizer includes a second linear pattern, which overlaps a second pixel, and a second bridge, which surrounds the second linear pattern. The display device may also include a black matrix, wherein the display device is divided into a first area overlapping the black matrix and a second area not overlapping the black matrix.

The bridge may be disposed in the first area. The bridge may be provided only in a bezel area, which surrounds a display area where an image is displayed.

The electro-conductive polarizer, which is disposed between the transparent substrate and the insulating layer of the display device, may form an equipotential.

According to the exemplary embodiments, it is possible to prevent defects caused by an electrostatic discharge.

In addition, it is possible to minimize or suppress the increase of parasitic capacitors between a gate line and an electro-conductive polarizer corresponding thereto.

Other features and exemplary embodiments will be apparent from the following detailed description, the drawings, and the claims.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
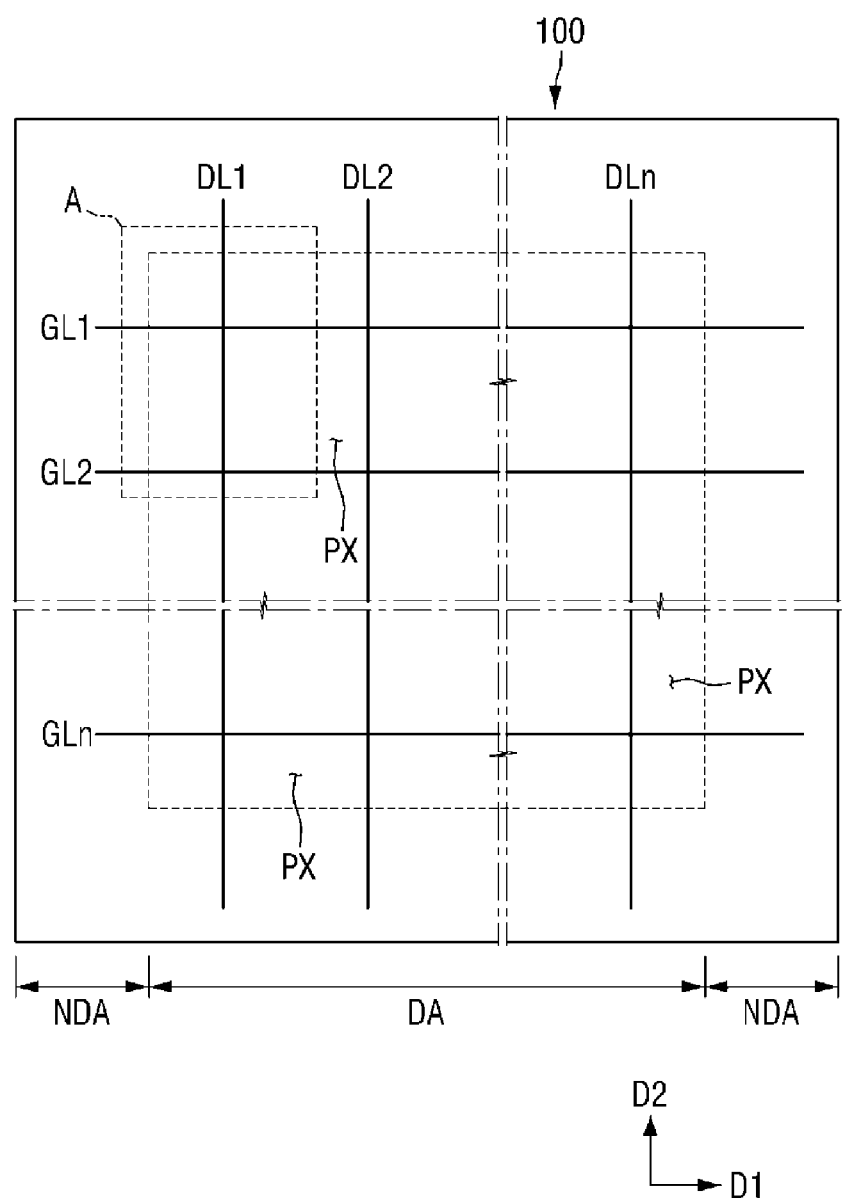
FIG. 1 is a schematic layout illustrating gate lines and data lines of a first display substrate of a display device according to an exemplary embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments will hereinafter be described with reference to the accompanying drawings.

FIG. 1 is a schematic layout illustrating a plurality of gate lines GL1, GL2, . . . , GLn and a plurality of data lines DL1, DL2, . . . , DLn of a first display substrate 100 of a display device according to an exemplary embodiment of the invention.

Referring to FIG. 1, the first display substrate 100 may include the gate lines GL1, GL2, . . . , GLn and the data lines DL1, DL2, . . . , DLn. The gate lines GL1, GL2, . . . , GLn may extend in a first direction D1. The data lines DL1, DL2, . . . , DLn may extend in a second direction D2.

The gate lines GL1, GL2, . . . , GLn may be formed of an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti) or tantalum (Ta), but the invention is not limited thereto.

The data lines DL1, DL2, . . . , DLn may be formed of nickel (Ni), cobalt (Co), Ti, Ag, Cu, Mo, Al, beryllium (Be), niobium (Nb), gold (Au), iron (Fe) or Ta, but the invention is not limited thereto.

The first display substrate 100 may be divided into a display area DA, in which an image is displayed, and a non-display area NDA, which surrounds the display area DA. The non-display area NDA is a region where no image is displayed, and may also be referred to as a bezel area.

In the display area DA, pixels PX are formed in a matrix shape. In each of the pixels PX, a thin-film transistor (not illustrated), a pixel electrode (not illustrated), etc., may be formed. In the non-display area NDA, a driving unit (not illustrated) may be formed to provide a gate driving signal and a data driving signal to each pixel electrode in the display area DA.

Figure 2:
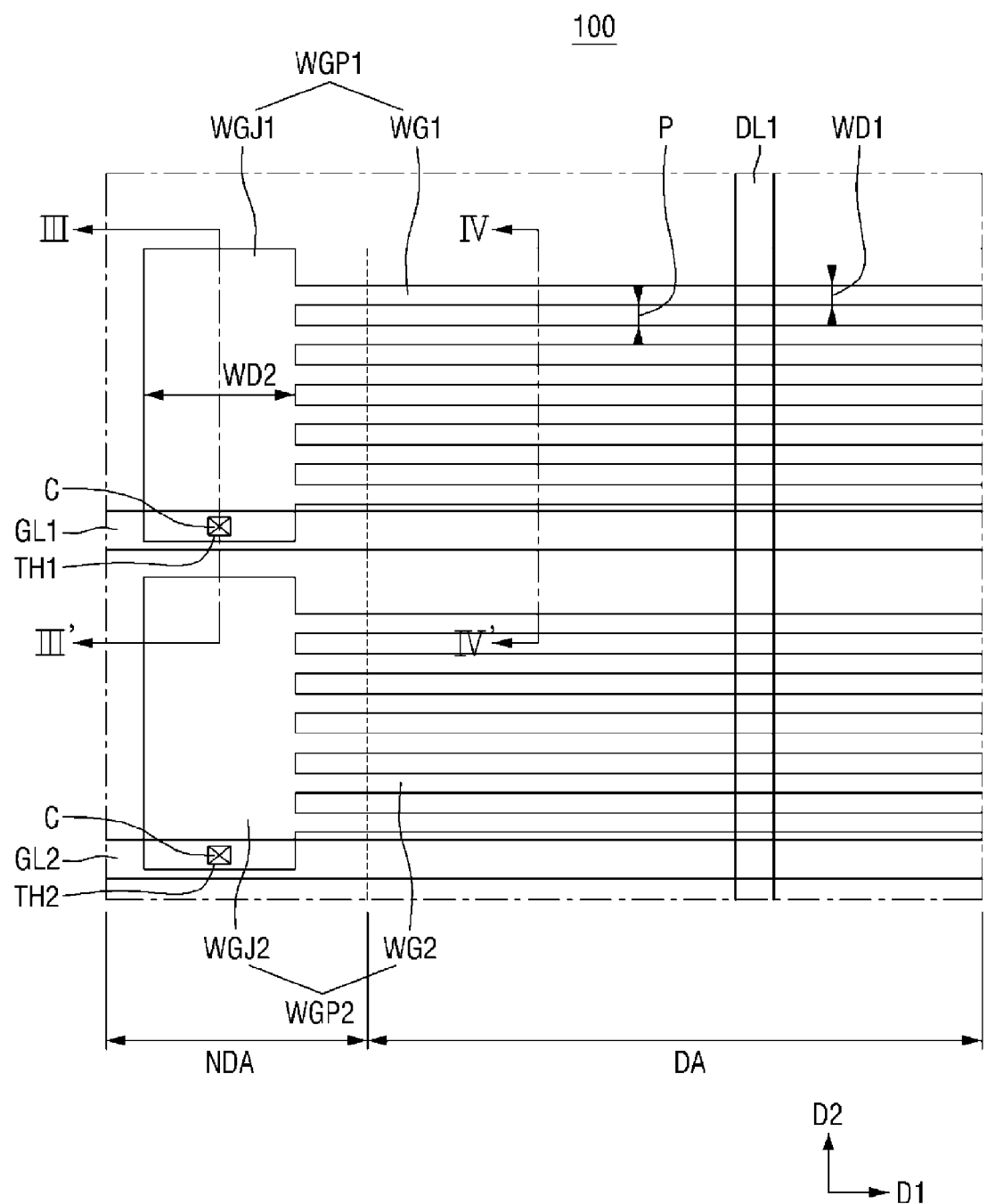
FIG. 2 is an enlarged view of portion A of FIG. 1 for explaining the arrangement of the gate lines and the data lines of FIG. 1 and electro-conductive polarizers.

FIG. 2 is an enlarged view of portion A of FIG. 1 for explaining the arrangement of the first and second gate lines GL1 and GL2 and the first and second data lines DL1 and DL2 of FIG. 1 and electro-conductive polarizers WGP1 and WGP2.

Referring to FIG. 2, the electro-conductive polarizers WGP1 and WGP2 may include a first electro-conductive polarizer WGP1 and a second electro-conductive polarizer WGP2. The first and second electro-conductive polarizers WGP1 and WGP2 may be formed of a metal. In a non-limiting example, the first and second electro-conductive polarizers WGP1 and WGP2 may be formed of Al, Cr, Au, Ag, Cu, Ni, Ti, Co, Mo or an alloy thereof, but the invention is not limited thereto.

The first electro-conductive polarizer WGP1 may include first metal wires WG1 and a first bridge WGJ1. The second electro-conductive polarizer WGP2 may include second metal wires WG2 and a second bridge WGJ2.

In a non-limiting example, the first metal wires WG1 and the second metal wires WG2 may be formed by nano-imprinting. Any excess charge generated during plasma etching may be distributed at the ends of the first metal wires WG1 and the second metal wires WG2, and may cause an electrostatic discharge between pairs of adjacent metal wires or metal lines such as gate lines etc. through a weak part of a display device, such as a crack in an insulating layer, thereby resulting in defects.

In the display device according to an exemplary embodiment of the invention, the first and second bridges WGJ1 and WGJ2 may be connected to a ground potential so that the first and second electro-conductive polarizers WGP1 and WGP2 may have an equipotential. This may prevent or minimize the electrostatic discharge that may be caused by excess charge.

Capacitive couplings between the first metal wires WG1 and the first gate line GL1 and between the second metal wires WG2 and the second gate line GL2 may increase parasitic capacitance in the first and second gate lines GL1 and GL2. In the display device according to an exemplary embodiment of the invention, the first metal wires WG1 and the second metal wires WG2 may be electrically connected to the first and second gate lines GL1 and GL2, respectively, thereby minimizing the increase of parasitic capacitance in the first and second gate lines GL1 and GL2.

The first metal wires WG1 and the second metal wires WG2 may be isolated from each other, and may extend in the first direction D1. The first metal wires WG1 and the second metal wires WG2 may have a first line width WD1 of dozens to hundreds of nanometers, and may be regularly arranged in parallel with each other. In a non-limiting example, the first line width WD1 may be in the range of 10 nm to 500 nm. In such range, the first and second electro-conductive polarizers WGP1 and WGP2 can provide favorable polarization performance. In another non-limiting example, the first line width WD1 may be in the range of 10 nm to 60 nm.

The first metal wires WG1 and the second metal wires WG2 may have a thickness of 10 nm to 500 nm, but the invention is not limited thereto. In a non-limiting example, the first metal wires WG1 and the second metal wires WG2 may have a thickness of 10 nm to 150 nm.

The first and second bridges WGJ1 and WGJ2 may be disposed in the non-display area NDA. The first metal wires WG1 and the second metal wires WG2 may be formed to extend to the non-display area NDA, or may be electrically connected to the first and second bridges WGJ1 and WGJ2, respectively, in the non-display area NDA. The first and second bridges WGJ1 and WGJ2 may be isolated, and insulated, from each other. That is, the first metal wires WG1 may be electrically connected only to the first bridge WGJ1, and the second metal wires WG2 may be electrically connected only to the second bridge WGJ2.

The first and second bridges WGJ1 and WGJ2 may have a second line width WD2. The second line width WD2 may be greater than the first line width WD1. The first and second bridges WGJ1 and WGJ2 may be provided on one side of the first metal wires WG1 and the second metal wires WG2, respectively, or on both sides of the first metal wires WG1 and the second metal wires WG2, respectively.

The non-display area NDA may include through holes TH1 and TH2. The through holes TH1 and TH2 may include a first through hole TH1 and a second through hole TH2. The first and second through holes TH1 and TH2 may be formed in the non-display area NDA to overlap the first and second gate lines GL1 and GL2, respectively.

Each of the first and second through holes TH1 and TH2 may be filled with an electric conductor C. The first through hole TH1 may electrically connect the first gate line GL1 and the first electro-conductive polarizer WGP1 via the electric conductor C included therein. That is, the first gate line GL1 may be electrically connected to the first bridge WGJ1 via the electric conductor C included in the first through hole TH1, and may be electrically connected to the first metal wires WG1 via the first bridge WGJ1. The second through hole TH2 may electrically connect the second gate line GL2 and the second electro-conductive polarizer WGP2 via the electric conductor C included therein. That is, the second gate line GL2 may be electrically connected to the second bridge WGJ2 via the electric conductor C included in the second through hole TH2, and may be electrically connected to the second metal wires WG2 via the second bridge WGJ2.

In a non-limiting example, the electric conductor C included in each of the first and second through holes TH1 and TH2 may be formed of the same metal as the first and second gate lines GL1 and GL2. Examples of the metal used to form the first and second gate lines GL1 and GL2 are as mentioned above.

Figure 3:
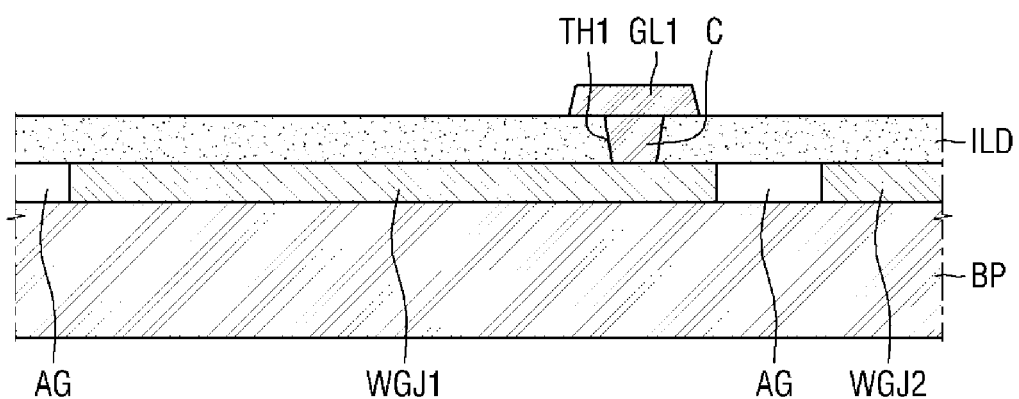
FIG. 3 is a schematic cross-sectional view taken along line III-III' of FIG. 2.

FIG. 3 is a schematic cross-sectional view taken along line III-III' of FIG. 2.

Referring to FIGS. 1 to 3, the first display substrate 100 may include a first insulating substrate BP, the first and second electro-conductive polarizers WGP1 and WGP2, an insulating layer ILD, the gate lines GL1, GL2, . . . , GLn, and the data lines DL1, DL2, . . . , DLn.

As illustrated in FIG. 3, the first and second bridges WGJ1 and WGJ2 may be disposed on the first insulating substrate BP, the insulating layer ILD may be disposed on the first and second bridges WGJ1 and WGJ2, and the first gate line GL1 may be disposed on the insulating layer ILD.

The material of the first insulating substrate BP may be appropriately selected in consideration of the use of the first insulating substrate BP and the type of processing that the first insulating substrate BP is to go through. In a non-limiting example, the first insulating substrate BP may be formed of glass, quartz, acrylic, triacetylcellulose (TAC), cyclic olefin copolymer (COP), cyclic olefin polymer (COC), polycarbonate (PC), polyethylenenaphthalate (PEN), or polyethersulfone (PES), but the invention is not limited thereto.

The first and second bridges WGJ1 and WGJ2 may be isolated, and insulated, from each other. An air layer AG may be interposed between the first and second bridges WGJ1 and WGJ2. The insulating layer ILD may also be interposed between the first and second bridges WGJ1 and WGJ2. The air layer AG may be a vacuum layer.

The insulating layer ILD may be formed to non-conductively treat the top surface of the first electro-conductive polarizer WGP1 and planarize the first electro-conductive polarizer WGP1. The insulating layer ILD may be formed of a non-conductive, transparent material. In a non-limiting example, the insulating layer ILD may be formed of silicon oxide (SiOx), silicon nitride (SiNx), and oxidized silicon carbide (SiOC). The insulating layer ILD may include the first through hole TH1. The first through hole TH1 may be filled with the metal that forms the first gate line GL1, and the first gate line GL1 may contact the first bridge WGJ1 via the metal that fills the first through hole TH1. Even though not specifically illustrated in FIG. 3, the second gate line GL2 may contact the second bridge WGJ2 via the metal that fills the second through hole TH2.

Figure 4:
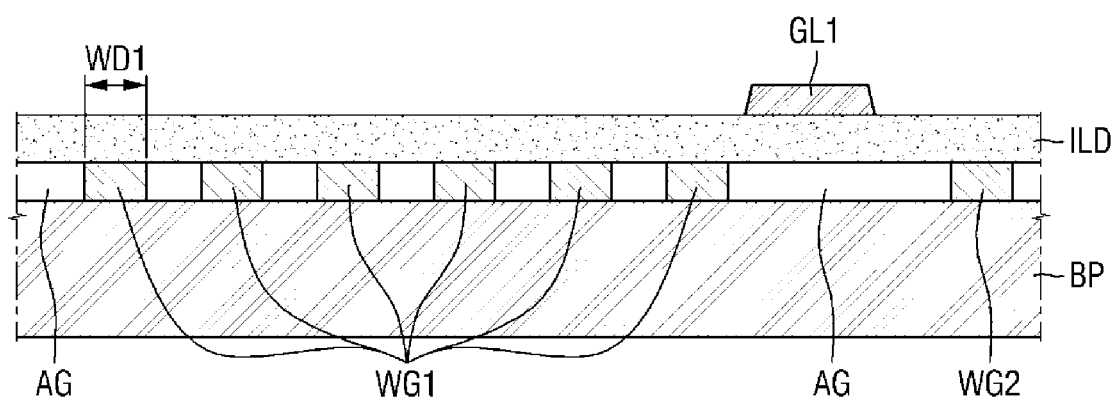
FIG. 4 is a schematic cross-sectional view taken along line IV-IV' of FIG. 2.

FIG. 4 is a schematic cross-sectional view taken alone line IV-IV' of FIG. 2.

Referring to FIG. 4, the first metal wire GW1 and the second metal wires GW2 may be disposed on the first insulating substrate BP. The first metal wires WG1 may be isolated, and insulated, from one another. The air layer AG may be interposed between the first metal wires WG1. The first metal wires WG1 and the second metal wires WG2 may be isolated, and insulated, from each other. The air layer AG may also be interposed between the first metal wires WG1 and the second metal wires WG2. The second metal wires WG2 may be isolated, and insulated, from one another. The air layer AG may also be interposed between the second metal wires WG1. Even though not specifically illustrated in FIG. 4, the insulating layer ILD may be interposed between the first metal wires WG1, between the second metal wires WG2, and between the first metal wires WG1 and the second metal wires WG2, respectively.

The insulating layer ILD may be disposed on the first metal wires WG1 and the second metal wires WG2. The first gate line GL1 may be disposed on the insulating layer ILD. The insulating layer ILD may completely insulate the first gate line GL1 and the first metal wires WG1 from each other. A structure that electrically connects the first gate line GL1 and the first bridge WGJ1 together by the electric conductor C via the first through hole TH1 may differ from what is illustrated in FIG. 3.

Display devices according to other exemplary embodiments of the invention will hereinafter be described. In the above description and the following description, like reference numerals indicate like reference numerals, and thus, repeating description will be omitted or simplified.

Figure 5:
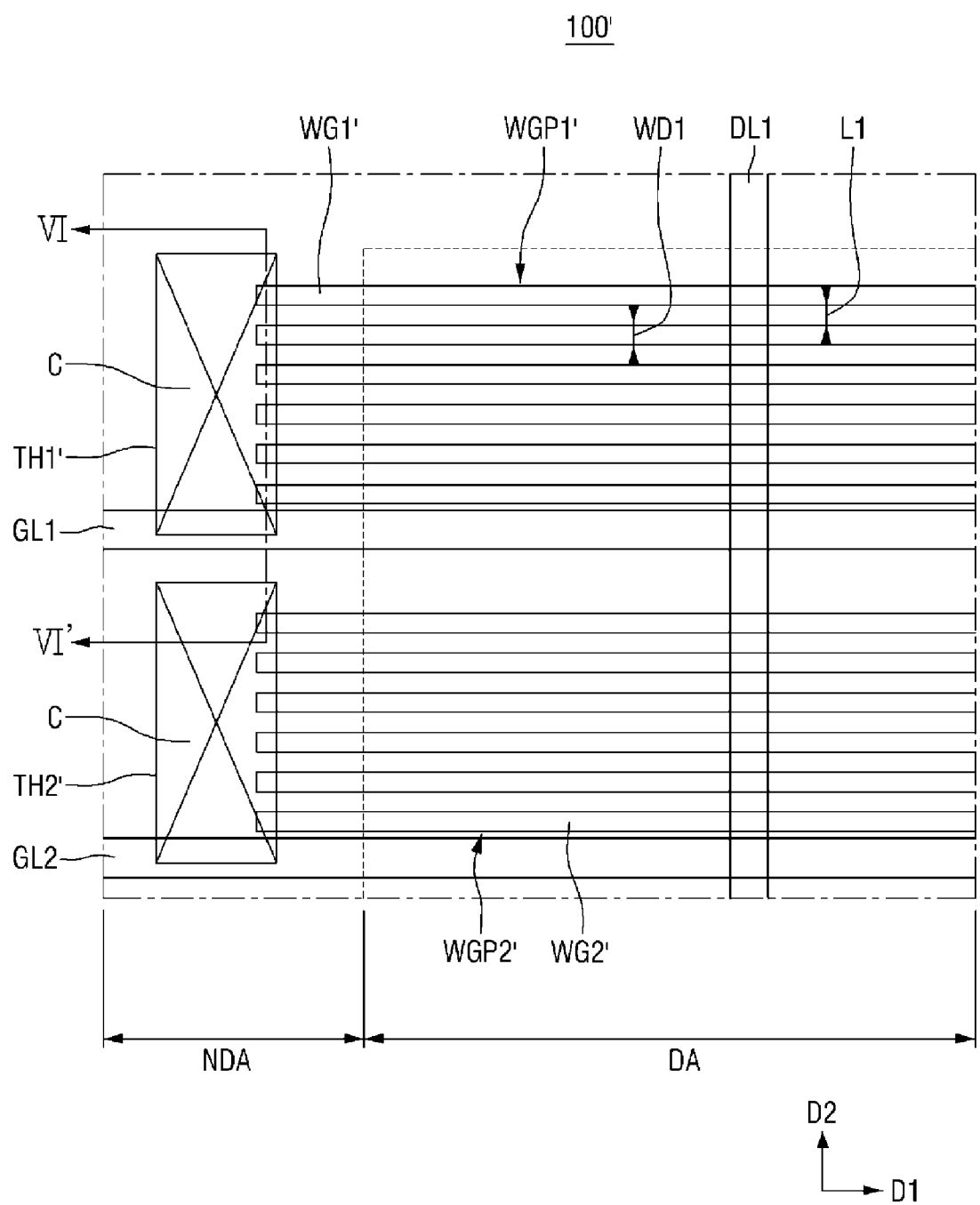
FIG. 5 is a schematic layout illustrating first and second gate lines, a first data line and first and second electro-conductive polarizers of a first display substrate of a display device according to another exemplary embodiment of the invention.

FIG. 5 is a schematic layout illustrating first and second gate lines GL1 and GL2, a first data line DL1 and first and second electro-conductive polarizers WGP1' and WGP2' of a first display substrate 100' of a display device according to another exemplary embodiment of the invention.

Referring to FIG. 5, the first and second electro-conductive polarizers WGP1' and WGP2' do not include first and second bridges WGJ1 and WGJ2, respectively, and thus differ from the first and second electro-conductive polarizers WGP1 and WGP2 of FIG. 2.

First and second through holes TH1' and TH2' are disposed in a non-display area NDA to overlap first metal wires WG1' and second metal wires WG2', respectively, and thus differ from their respective counterparts of FIG. 2, i.e., the first and second through holes TH1 and TH2. More specifically, as illustrated in FIG. 2, the first and second through holes TH1 and TH2 are disposed in the non-display area NDA, but do not overlap the first metal wires WG1 and the second metal wires WG2, respectively. Instead, the first and second through holes TH1 and TH2 may be disposed in the non-display area NDA to overlap the first and second gate lines GL1 and GL2, respectively.

As illustrated in FIG. 5, each of the first and second through holes TH1' and TH2' may be filled with an electric conductor C. In a non-limiting example, the electric conductor C may be formed of a metal that forms the first and second gate lines GL1 and GL2. The first through hole TH1' may electrically connect the first gate line GL1 and the first metal wires WG1 together via the electric conductor C included therein. The second through hole TH2' may electrically connect the second gate line GL2 and the second metal wires WG2 together via the electric conductor C included therein. The first metal wires WG1 may directly contact the electric conductor C included in the first through hole TH1' corresponding thereto, and may be electrically connected to the first gate line GL1, and the second metal wires WG2 may directly contact the electric conductor C included in the second through hole TH2' corresponding thereto, and may be electrically connected to the second gate line GL2.

Figure 6:
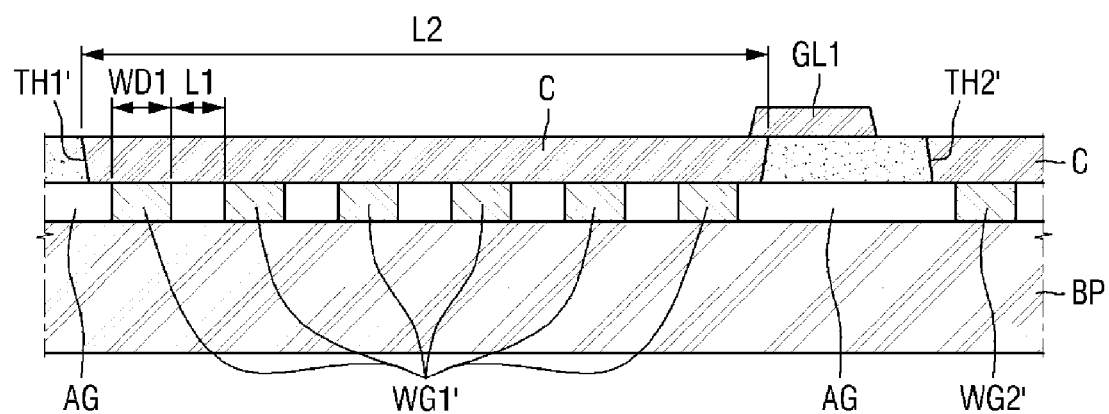
FIG. 6 is a schematic cross-sectional view taken along line VI-VI' of FIG. 5.

FIG. 6 is a schematic cross-sectional view taken along line VI-VI' of FIG. 5.

Referring to FIG. 6, an insulating layer ILD may include the first and second through holes TH1' and TH2'. The first through hole TH1' may be disposed above the first metal wires WG1', and the second through hole TH2' may be disposed above the second metal wires WG2'. The first through hole TH1' may be formed to have a length L2, which is greater than the sum of pitch distances L1' between the first metal wires WG1' and first line widths WD1' of the first metal wires WG1'. Each of the first and second through holes TH1' and TH2' may be filled with an electric conductor C. The electric conductor C may be formed of the metal that forms the first gate line GL1. The first gate line GL1 may be disposed on the insulating layer ILD, and may contact the electric conductor C in the first through hole TH1'. Even though not specifically illustrated in FIG. 6, the second gate line GL2 may be disposed on the insulating layer ILD, and may contact the electric conductor C in the second through hole TH2'. Referring further to FIG. 6, the first metal wires WG1' and the second metal wires WG2' may be disposed on the first insulating substrate BP. The first metal wires WG1' may be isolated and insulated from one another. An air layer AG may be interposed between the first metal wires WG1'. The first metal wires WG1' and the second metal wires WG2' may be isolated and insulated from each other. The air layer AG may also be interposed between the first metal wires WG1' and the second metal wires WG2'. The first metal wires WG1' and second metal wires WG2' may be isolated with a pitch distance L1' and insulated from one another, respectively. Also, the air layer AG may also be interposed between metal wires WG1' and WG2', respectively. Even though not specifically illustrated in FIG. 4, the insulating layer ILD, instead of the air layer AG, may be interposed between the first metal wires WG1, between the second metal wires WG2, and between the first metal wires WG1 and the second metal wires WG2, respectively.

Figure 7:
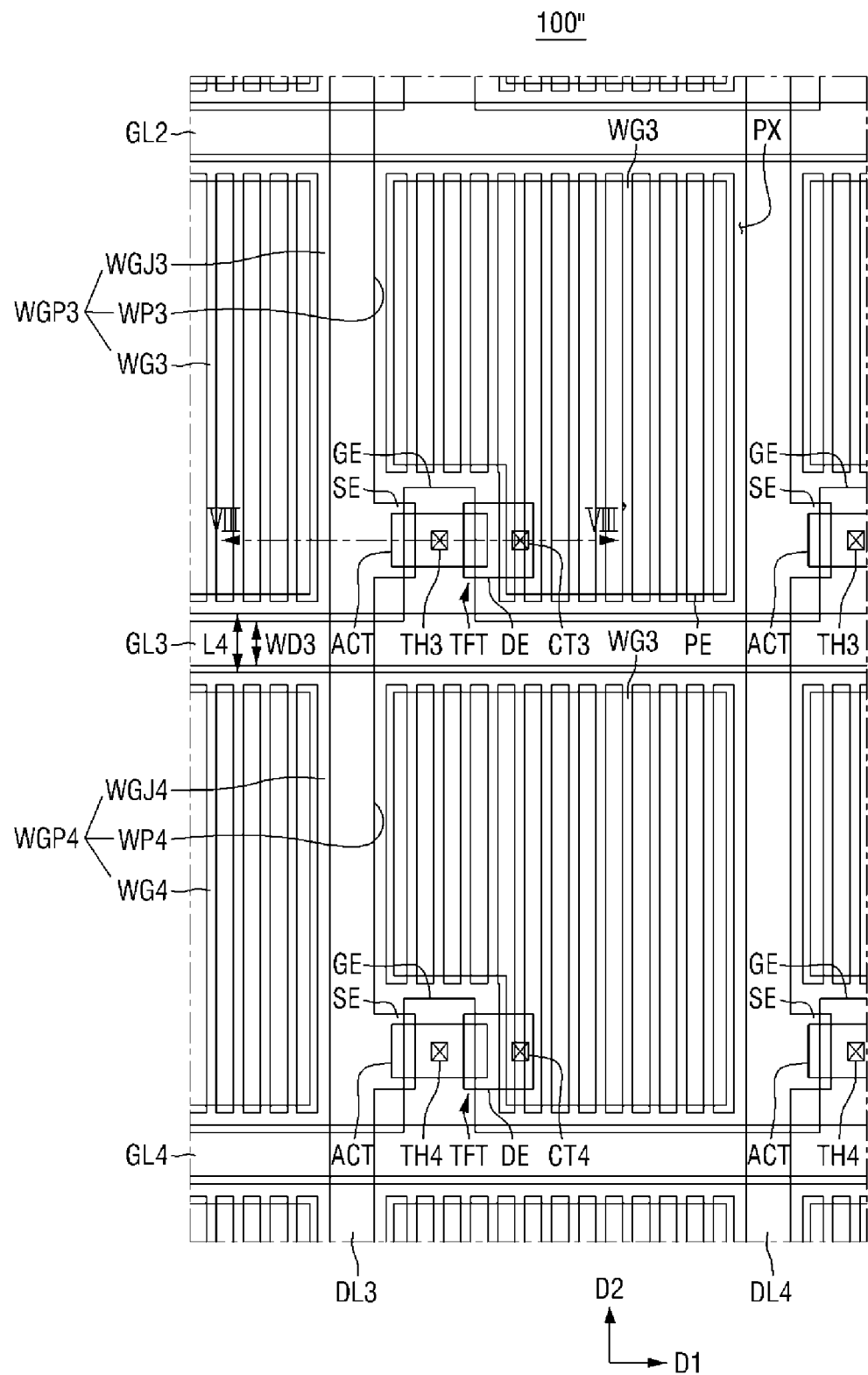
FIG. 7 is a schematic layout illustrating third and fourth gate lines, third and fourth data lines, and third and fourth electro-conductive polarizers of a first display substrate of a display device according to another exemplary embodiment of the invention.

FIG. 7 is a schematic layout illustrating third and fourth gate lines GL3 and GL4, third and fourth data lines DL3 and DL4, and third and fourth electro-conductive polarizers WGP3 and WGP4 of a first display substrate 100" of a display device according to another exemplary embodiment of the invention.

Referring to FIG. 7, the third and fourth gate lines GL3 and GL4 may extend in the first direction D1. The third and fourth data lines DL3 and DL4 may extend in the second direction D2. Pixels PX may be arranged in a matrix pattern and pixel electrodes PE may be disposed in the pixels PX, respectively.

The third electro-conductive polarizer WGP3 may include a third linear pattern WP3 and a third bridge WGJ3, which surrounds the third linear pattern WP3. The fourth electro-conductive polarizer WGP4 may include a fourth linear pattern WP4 and a fourth bridge WGJ4, which surrounds the fourth linear pattern WP4.

The third and fourth linear patterns WP3 and WP4 may be disposed to overlap the pixels PX. In an exemplary embodiment, the third linear pattern WP3 may include third metal wires WG3, which extend in the second direction D2, and the fourth linear pattern WP4 may include fourth metal wires WG4, which extend in the second direction D2. However, the invention is not limited to this exemplary embodiment. That is, the third linear pattern WP3 may include third metal wires WG3, which extend in the first direction D1, and the fourth linear pattern WP4 may include fourth metal wires WG4, which extend in the first direction D1.

The third and fourth bridges WGJ3 and WGJ4 are disposed in a display area, and may thus differ from their respective counterparts of FIG. 2, i.e., the first and second bridges WGJ1 and WGJ2, which are disposed in a non-display area NDA. The third and fourth bridges WGJ3 and WGJ4 may be formed as window frames surrounding the third and fourth linear patterns WP3 and WP4, respectively. The third and fourth bridges WGJ3 and WGJ4 may be disposed to overlap parts of the pixels PX, thin-film transistors (TFTs), and the third and fourth data lines DL3 and DL4. The third and fourth bridges WGJ3 and WGJ4 may be disposed not to overlap the third and fourth gate lines GL3 and GL4. The third and fourth bridges WGJ3 and WGJ4 may be isolated from each other by a distance L4, which is greater than a width WD3 of the third and fourth gate lines GL3 and GL4. Each of the third and fourth electro-conductive polarizers WGP3 and WGP4 may include a plurality of linear patterns WP3 and WP4, which correspond to the pixels PX, respectively, as single unit parts.

In an alternative exemplary embodiment, the third and fourth bridges WGJ3 and WGJ4 may be disposed not to overlap the third and fourth data lines DL3 and DL4. That is, the third and fourth bridges WGJ3 and WGJ4 may be disposed to overlap only parts of the pixels PX and the TFTs. In this alternative exemplary embodiment, a plurality of third and fourth electro-conductive polarizers WGP3, WGP4 may be provided in the pixels PX, respectively, as separate, independent parts.

Each of the TFTs may include a gate electrode GE, a semiconductor layer ACT, a source electrode SE and a drain electrode DE. The gate electrode GE may be branched off from the third or fourth gate line GL3 or GL4 in the second direction D2. The source electrode SE may be branched off from the third or fourth data line DL3 or DL4 in the first direction D1. The drain electrode DE may be isolated from the source electrode SE, and part of the source electrode SE and part of the drain electrode DE may be disposed to overlap part of the semiconductor layer ACT. Part of the drain electrode DE may be disposed to overlap one of the pixel electrodes PE.

The third and fourth linear patterns WP3 and WP4 may include third and fourth contact holes CT3 and CT4, respectively, and the third and fourth contact holes CT3 and CT4 may be disposed to overlap the pixel electrodes PE, respectively. The pixel electrode PE and the drain electrode DE of each of the TFTs may be electrically connected together via the third or fourth contact hole CT3 or CT4. The pixel electrodes PE may be provided with a data voltage via the TFTs, which are switching devices.

The third and fourth bridges WGJ3 and WGJ4 may include third and fourth through holes TH3 and TH4, respectively. The third and fourth bridges WGJ3 and WGJ4 may be electrically connected to the gate electrodes GE of the TFTs, respectively, via the third and fourth through holes TH3 and TH4, respectively.

Figure 8:
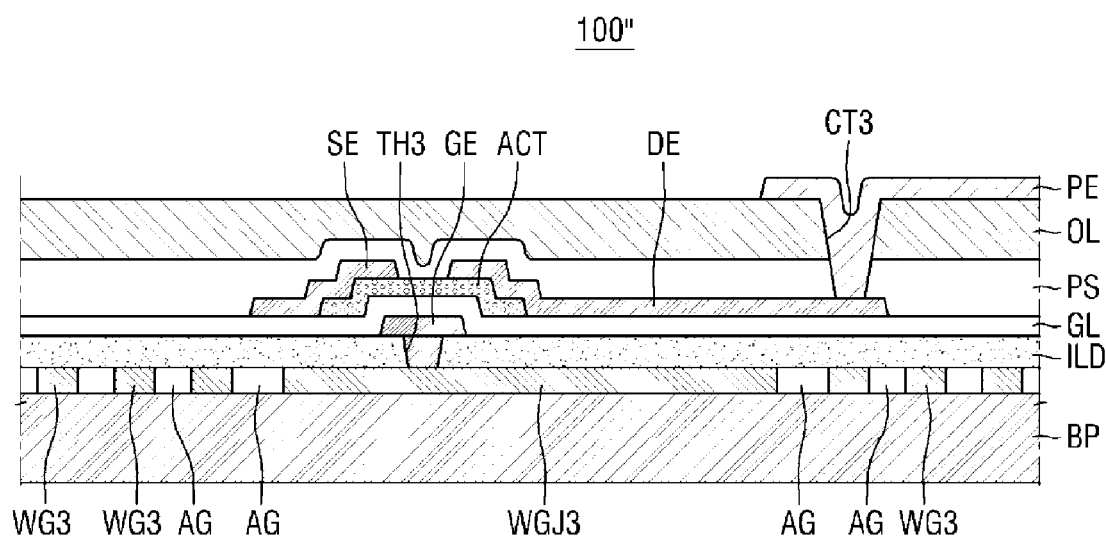
FIG. 8 is a schematic cross-sectional view taken along line VIII-VIII' of FIG. 7.

FIG. 8 is a schematic cross-sectional view taken along line VIII-VIII' of FIG. 7.

Referring to FIG. 8, the third metal wires WG3 and the third bridge WGJ3 are disposed on a first insulating substrate BP. The third metal wires WG3 may be isolated from one another, and the third metal wires WG3 and the third metal bridge WGJ3 may be isolated from each other. However, the third bridge WGJ3 electrically may connect the third metal wires WG3 together in the area which surrounds the third metal wires WG3. An insulating layer ILD may be disposed on the third metal wires WG3, the third bridge WGJ3 and may include the third through hole TH3. The third through hole TH3 is filled with an electric conductor C. In a non-limiting example, the electric conductor C may be formed of a metal that forms the third gate line GL3. A gate electrode GE may be disposed on the insulating layer ILD, and may be electrically connected to the third bridge WGJ3 via the electric conductor C.

The gate electrode GE may be disposed on the insulating layer ILD. A gate insulating layer GL may be disposed on the gate electrode GE. The semiconductor layer ACT and an ohmic contact layer (not illustrated) may be disposed on the gate insulating layer GL. A source electrode SE and a drain electrode DE, which is isolated from the source electrode SE, may be formed on the semiconductor layer ACT and the ohmic contact layer. A passivation layer PS, which is a type of insulating layer formed of an insulating material, such as a silicon nitride layer, a silicon oxide layer or a silicon oxynitride layer, may be formed on the source electrode SE and the drain electrode DE, and an organic layer OL, which includes an organic material, may be formed on the passivation layer PS. The passivation layer PS and the organic layer OL may also be formed in a non-display area NDA. The passivation layer PS may be optional. A pixel electrode PE, which includes a conductive material, may be formed, for a pixel PX, on part of the organic layer OL in the display area DA. The pixel electrode PE may be electrically connected to the drain electrode DE through the third contact hole CT3, which is formed through the organic layer OL and the passivation layer PS to expose the drain electrode DE therethrough. The pixel electrode PE may be formed of indium tin oxide (ITO), indium zinc oxide (IZO), indium oxide, zinc oxide, tin oxide, gallium oxide, titanium oxide, Al, Ag, Pt, Cr, Mo, Ta, Nb, zinc (Zn), magnesium (Mg), or an alloy or a deposition layer thereof.

Figure 9:
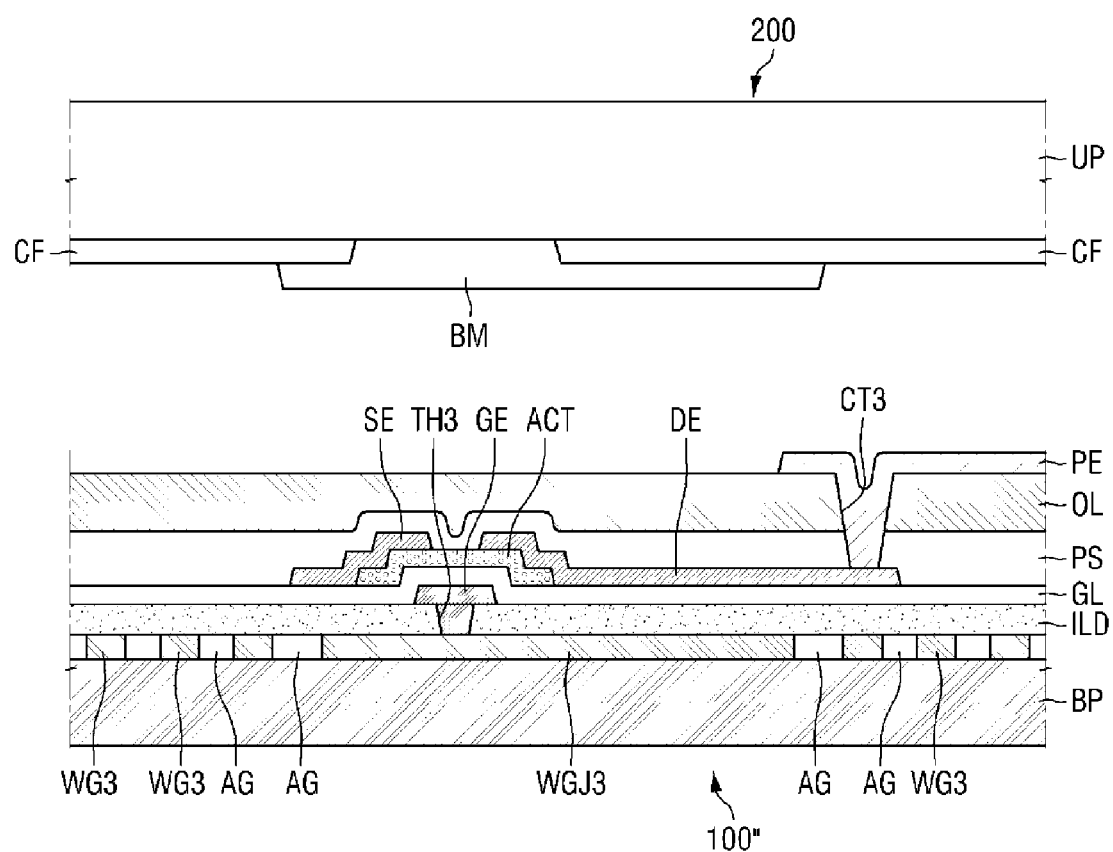
FIG. 9 is a schematic cross-sectional view illustrating the display device according to the exemplary embodiment of FIG. 7.

FIG. 9 is a cross-sectional view of the display device according to the exemplary embodiment of FIG. 7. The cross-sectional view of FIG. 9 corresponds to the area of FIG. 8.

Referring to FIG. 9, a second display substrate 200 may be disposed on the first display substrate 100". The second display substrate 200 may include a second insulating substrate UP and a black matrix BM and a color filter CF, which are disposed on the second insulating substrate UP. The second display substrate 200 may have the second insulating substrate UP as a base substrate thereof. The second insulating substrate UP may be formed of the same material(s) as the first insulating substrate BP. The black matrix BM may be disposed to overlap the third bridge WGJ3. The color filter CF may be disposed to overlap the third metal wires WG3. Even though not specifically illustrated in FIG. 9, the black matrix BM may also be formed in the non-display area NDA.

An overcoat layer (not illustrated) and a common electrode (not illustrated) may be formed on the color filter CF and the black matrix BM. A liquid crystal layer (not illustrated) may be disposed between the first display substrate 100" and the second display substrate 200. The pixel electrode PE of the first display substrate 100" and the common electrode of the second display substrate 200 may be disposed to face each other, and may form an electric field together in the liquid crystal layer.

Figure 10:
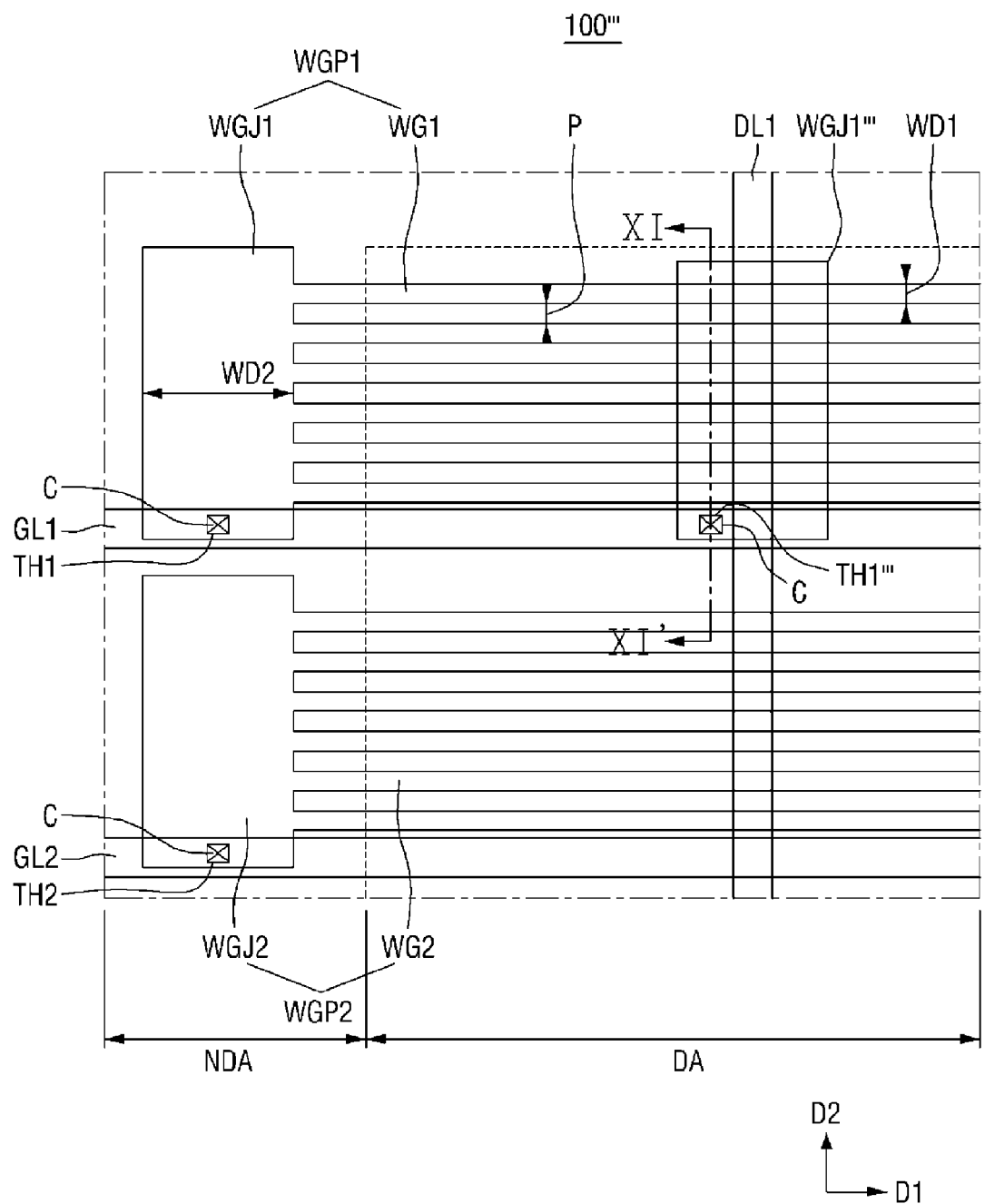
FIG. 10 is a schematic cross-sectional view illustrating a first display substrate of a display device according to another exemplary embodiment of the invention.
Figure 11:
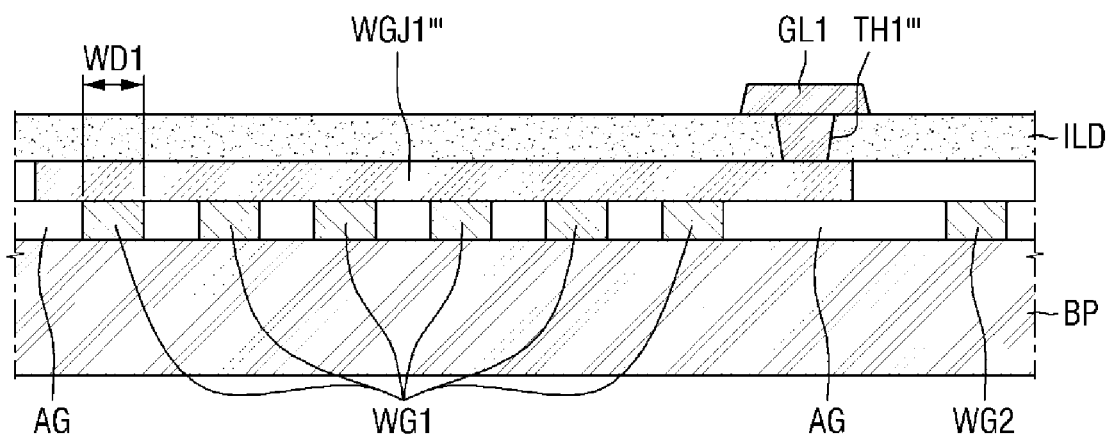
FIG. 11 is a schematic cross-sectional view taken along line XI-XI' of FIG. 10.

FIG. 10 is a schematic cross-sectional view illustrating a first display substrate 100' of a display device according to another exemplary embodiment of the invention. FIG. 11 is a cross-sectional view taken along line XI-XI' of FIG. 10.

Referring to FIGS. 10 and 11, the first display substrate 100''' may include a first bridge WGJ1''' and a first through hole TH1''', which are disposed in a display area DA, and thus differs from the first display substrate 100 of FIG. 2 where the first bridge WGJ1 and the first through hole TH1 are disposed in the non-display area NDA. Also, in the first display substrate 100''', unlike in the first display substrate 100, the first bridge WGJ1''' may be disposed on first metal wires WG1', rather than being on a same plane with the first metal wires WG1. That is, in the first display substrate 100''', unlike in the first display substrate 100 of FIG. 2, the first bridge WGJ1''' is disposed between the first metal wires WG1 and an insulating layer ILD.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
   a transparent substrate;
   an insulating layer including a through hole and disposed on the transparent substrate;
   a gate line disposed on the insulating layer; and
   an electro-conductive polarizer disposed between the transparent substrate and the insulating layer,
   wherein the electro-conductive polarizer comprises a plurality of metal wires, which are isolated from one another, and at least one bridge, which electrically connects the metal wires together.

2. The display device of claim 1, wherein the through hole is filled with an electric conductor.

3. The display device of claim 2, wherein the electric conductor is electrically connected to the electro-conductive polarizer.

4. The display device of claim 3, wherein the electric conductor is electrically connected to the gate line.

5. The display device of claim 2, wherein the electric conductor is formed of a metal that forms the gate line.

6. The display device of claim 1, wherein the electro-conductive polarizer is formed of a metal.

7. The display device of claim 1, wherein the metal wires have a first line width, the bridge has a second line width, which is greater than the first line width, and the bridge is electrically connected to the gate line via the through hole.

8. The display device of claim 7, further comprising:
a black matrix,
wherein the display device is divided into a first area overlapping the black matrix and a second area not overlapping the black matrix and the bridge is disposed in the first area.

9. The display device of claim 8, wherein the bridge is provided only in a bezel area, which surrounds a display area where an image is displayed.

10. The display device of claim 7, wherein a longitudinal axis of the metal wires is parallel to a first direction, a longitudinal axis of the bridge is parallel to a second direction, which is perpendicular to the first direction, and the gate line extends in the first direction.

11. The display device of claim 7, wherein the electro-conductive polarizer includes a linear pattern and a bridge part, which surrounds the linear pattern, the linear pattern includes a plurality of conductive metal wires, which are isolated from one another, and the bridge electrically connects the conductive metal wires together.

12. The display device of claim 11, wherein the bridge part is disposed to overlap boundaries of a pixel electrode.

13. The display device of claim 7, further comprising:
a plurality of pixels arranged in rows and columns,
wherein a first bridge, which is electrically connected to an n-th gate line that transmits a gate signal to an n-th row of pixels, and a second bridge, which is electrically connected to an (n+1)-th gate line that transmits a gate signal to an (n+1)-th row of pixels, and the first and second bridges are insulated from each other.

14. The display device of claim 7, further comprising:
a plurality of pixels arranged in rows and columns,
wherein the electro-conductive polarizer further comprises first and second electro-conductive polarizers, which are independent from each other, the first electro-conductive polarizer includes a first linear pattern, which overlaps a first pixel, and a first bridge, which surrounds the first linear pattern, and the second electro-conductive polarizer includes a second linear pattern, which overlaps a second pixel, and a second bridge, which surrounds the second linear pattern.

15. The display device of claim 7, wherein the bridge is disposed on a level with the metal wires.

16. The display device of claim 7, wherein the bridge is disposed between the metal wires and the insulating layer.

17. A display device, comprising:
a transparent substrate;
a liquid crystal layer;
a black matrix;
an insulating layer including a through hole and disposed between the transparent substrate and the liquid crystal layer;
a gate line disposed on the insulating layer; and
an electro-conductive polarizer including a plurality of metal wires, which are isolated from one another, and at least one bridge, which electrically connects the metal wires together, wherein the bridge is disposed in an area overlapping the black matrix, the electro-conductive polarizer forms an equipotential and is disposed between the transparent substrate and the insulating layer.

18. The display device of claim 17, wherein the bridge is provided only in a bezel area, which surrounds a display area where an image is displayed.

19. The display device of claim 17, further comprising:
a plurality of pixels arranged in rows and columns,
wherein a first bridge, which is electrically connected to a plurality of metal wires that overlap an n-th row of pixels, and a second bridge, which is electrically connected to a plurality of metal wires that overlap an (n+1)-th row of pixels, and the first and second bridges are insulated from each other.

20. The display device of claim 17, further comprising:
a plurality of pixels arranged in rows and columns,
wherein the electro-conductive polarizer further comprises first and second electro-conductive polarizers, which are independent from each other, the first electro-conductive polarizer includes a first linear pattern, which overlaps a first pixel, and a first bridge, which surrounds the first linear pattern, and the second electro-conductive polarizer includes a second linear pattern, which overlaps a second pixel, and a second bridge, which surrounds the second linear pattern.

* * * * *